(12) United States Patent
Glaser et al.

(10) Patent No.: US 7,443,789 B2
(45) Date of Patent: Oct. 28, 2008

(54) PROTECTION SWITCHING MECHANISM

(75) Inventors: Donald J. Glaser, Huntington Beach, CA (US); Anthony Barrera, Chino Hills, CA (US); William W. Lu, Irvine, CA (US); Dennis P. Miller, Fullerton, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 1437 days.

(21) Appl. No.: 09/990,023

(22) Filed: Nov. 21, 2001

(65) Prior Publication Data

US 2003/0095502 A1    May 22, 2003

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/28* (2006.01)
*H04B 1/38* (2006.01)

(52) U.S. Cl. .................. 370/228; 370/216; 455/561

(58) Field of Classification Search .............. 370/228, 370/227, 220, 216, 248, 224, 395, 218, 323, 370/325, 535, 225, 342, 244, 217, 466, 370, 370/406, 389, 369, 390, 328, 222, 476, 528, 370/229, 312, 280, 338, 335, 341, 421, 463, 370/465, 245, 907; 340/825.01, 825.02, 340/825.21, 146.2, 825, 644, 692; 342/173, 342/408; 709/223, 238, 230, 232, 219; 710/39; 712/11; 455/67.11, 561, 507, 560, 450; 379/273, 379/229, 333; 375/222, 219, 152; 714/4; 398/2, 5, 10, 17

See application file for complete search history.

(56) References Cited

U.S. PATENT DOCUMENTS

| 3,715,503 | A | * | 2/1973 | Jungbluth et al. | ............ 370/228 |
| 4,160,127 | A | * | 7/1979 | Slana et al. | ................. 370/217 |
| 4,412,323 | A | * | 10/1983 | Abbott et al. | ............... 370/217 |
| 4,633,246 | A | * | 12/1986 | Jones et al. | ................. 370/224 |

(Continued)

OTHER PUBLICATIONS

A new synchronization algorithm for hitless protection switching in ATM□□Performance, Computing and Communications Conference, 1999. IPCCC '99. IEEE International□□Feb. 10-12, 1999 pp. 370-376.*

(Continued)

*Primary Examiner*—Wing F. Chan
*Assistant Examiner*—Prenell P Jones
(74) *Attorney, Agent, or Firm*—Fogg & Powers LLC

(57) ABSTRACT

A system and method for protection switching in a transmission network is described. A protection switching mechanism comprises a multiplexer, a transmission path for each output of the multiplexer and a remote circuit. The multiplexer has an input coupled to receive an input signal and a plurality of outputs to output a plurality of output signals. Each transmission path is coupled to receive an associated output signal from the multiplexer. The transmission paths further include one or more redundant transmission paths, wherein signals directed to a faulty transmission path are redirected to an associated redundant transmission path. The remote circuit is used to selectively switch a redundant transmission path for a faulty transmission path at a subscriber.

65 Claims, 9 Drawing Sheets

U.S. PATENT DOCUMENTS

| | | | |
|---|---|---|---|
| 5,132,692 A * | 7/1992 | LaBerge | 342/173 |
| 5,155,483 A * | 10/1992 | Morimoto | 370/228 |
| 5,345,437 A * | 9/1994 | Ogawa | 370/228 |
| 5,365,510 A * | 11/1994 | Nicholson et al. | 370/222 |
| 5,408,462 A | 4/1995 | Opoczynski | |
| 5,453,737 A | 9/1995 | Opoczynski | |
| 5,509,065 A * | 4/1996 | Fitzgerald | 379/279 |
| 5,548,792 A * | 8/1996 | Babonneau | 710/39 |
| 5,581,228 A * | 12/1996 | Cadieux et al. | 340/146.2 |
| 5,638,358 A * | 6/1997 | Hagi | 370/228 |
| 5,671,432 A * | 9/1997 | Bertolet et al. | 712/11 |
| 5,754,527 A * | 5/1998 | Fujita | 370/217 |
| 6,115,355 A * | 9/2000 | Rao | 370/227 |
| 6,188,912 B1 * | 2/2001 | Struhsaker et al. | 455/561 |
| 6,301,225 B1 * | 10/2001 | Murdock | 370/227 |
| 6,307,834 B1 * | 10/2001 | Worster | 370/218 |
| 6,611,526 B1 * | 8/2003 | Chinnaswamy et al. | 370/406 |
| 6,785,285 B1 * | 8/2004 | Romana et al. | 370/395.51 |
| 6,853,680 B1 * | 2/2005 | Nikolich | 375/222 |
| 6,894,969 B1 * | 5/2005 | Chidambaran et al. | 370/216 |
| 6,894,971 B2 * | 5/2005 | Watanabe | 370/228 |
| 2002/0163881 A1 * | 11/2002 | Dhong et al. | 370/225 |
| 2003/0163555 A1 * | 8/2003 | Battou et al. | 709/223 |

OTHER PUBLICATIONS

Hi Gain; Technical Pratice, PSC-606 List 1 Protection Controller, Feb. 9, 2001, ADC DSL Systems, Inc., Issue 01, entire document.*

* cited by examiner

US 7,443,789 B2

PROTECTION SWITCHING MECHANISM

TECHNICAL FIELD

The present invention relates generally to the field of telecommunications and in particular a system and method for protection switching.

BACKGROUND

Telecommunication networks carry various types of information between users, e.g., voice, data, video. A typical telecommunications network includes many components or modules that work together to make a connection between users. For example, a telecommunications network typically includes switches, transport lines, terminals and other conventional equipment used to create transmission path connections between users.

Errors can occur in any one of these modules of the network creating a faulty transmission path. For example, a fiber optic cable that carries signals for the network can be cut inadvertently or otherwise damaged such that it cannot acceptably carry data. To prevent errors of this nature from hindering communications, networks include redundant components so that when a working component stops functioning acceptably, a redundant or protection component can be switched into the network in place of the non-working component. Thus, the network is able to continue to carry information despite errors. This is referred to in the industry as network survivability. Although, the use of redundant components has its applications, it is desired in the art to have an efficient method of routing signals dedicated to a faulty transmission path through an alternate transmission path to the desired customer.

For the reasons stated above and for other reasons stated below which will become apparent to those skilled in the art upon reading and understanding the present specification, there is a need in the art for an improved method of replacing faulty transmission paths.

SUMMARY

The above-mentioned problems with protection switching mechanisms in integrated circuits and other problems are addressed by the present invention and will be understood by reading and studying the following specification.

In one embodiment, a protection switching mechanism is disclosed. The protection switching mechanism comprises a multiplexer, a transmission path for each output of the multiplexer and a remote circuit. The multiplexer has an input coupled to receive an input signal and a plurality of outputs to output a plurality of output signals. Each transmission path is coupled to receive an associated output signal from the multiplexer. The transmission paths further include one or more redundant transmission paths, wherein signals directed to a faulty transmission path are redirected to an associated redundant transmission path. The remote circuit is used to selectively switch a redundant transmission path for a faulty transmission path at a subscriber.

In another embodiment, a protection switching transmission path device is disclosed. The protection switching transmission path device includes a central office, a remote circuit a plurality of standard transmission paths and a plurality of redundant transmission paths. The central office includes a multiplexer and a management unit. The multiplexer has an input and a plurality of outputs. The management unit is coupled to control the multiplexer. The remote circuit includes a plurality of relays and a controller card. The controller card is coupled to control the plurality of relays, wherein the control card is coupled to receive control signals from the management unit. Each standard transmission path is coupled between an output of the multiplexer and an associated relay. Each redundant transition path is coupled between an output of the multiplexer and an associated relay. Each redundant transmission path is further associated with a group of standard transmission paths, wherein if a standard transmission path in a group of transmission paths is detected as being faulty the management unit directs the multiplexer and the controller card to switch an associated redundant transmission path for the faulty standard transmission path.

In another embodiment, a protection switching device is disclosed. The protection switching device includes a plurality of standard transmission paths and a redundant transmission path. The plurality of standard transmission paths are coupled between a central office and a remote circuit. The redundant transmission path is selectively coupled to replace one in a group of the plurality of standard transmission paths. The remote circuit has a switch relay for each standard transmission path. Each switch relay is coupled to an associated standard transmission path. Each switch relay has a first position to provide a connection to a subscriber and a second position to provide a connection to the redundant transmission path, wherein when one of the plurality of standard transmission paths is found to be faulty its associated relay is positioned to the second position. The remote circuit also has a redundant relay for each redundant transmission path. The redundant transmission path is coupled to an associated redundant relay. The redundant relay having a first position to provide a current loop path and a second position to provide an open circuit, wherein when one of the plurality of standard transmission paths in a group of standard transmission paths is found to be faulty a redundant relay coupled to an associated redundant transmission path is placed in its second position so signals in the redundant transmission path are routed to the subscriber.

In another embodiment, a protection switching mechanism is disclosed. The protection switching mechanism including a multiplexer, a plurality of line units, one or more redundant line units, a remote unit for each line unit, a redundant remote unit for each redundant line unit, a relay for each remote unit and each redundant remote unit and a management unit. The multiplexer has an input coupled to receive an input signal and a plurality of outputs to output a plurality of output signals. Each line unit is coupled to selectively receive an associated output of the multiplexer. The redundant line unit is selectively coupled to receive an output of the multiplexer associated with a line unit that is coupled to a faulty transmission path. Each remote unit is coupled to an associated line unit. The redundant remote unit is coupled to an associated redundant line unit. Each relay is coupled an associated remote unit and each relay for each redundant remote unit is coupled to an associated redundant remote unit. The management unit is used to control the output of the multiplexer and the relays, wherein when the management unit detects a line unit coupled to a faulty transmission line an output of the multiplexer assigned to the line unit coupled to the faulty transmission line is directed to an associated redundant line unit instead and a relay coupled to the faulty transmission line as well as a redundant relay associated with the redundant line unit are switched to provide an alternate signal path around the faulty transmission line.

In another embodiment, a remote circuit is disclosed, the remote circuit includes a remote shelf enclosure. The remote shelf enclosure has a plurality of remote unit slots, a protection remote unit slot, a protecting switching controller slot and a power supply module slot. A remote unit card that has a remote unit is removably coupled in each remote unit slot. A protection remote unit card that has a protection remote unit is removably coupled in the protection remote unit slot. A protection switching controller card that has a protection switching controller is removable coupled in the protecting switching controller slot. In addition, a power supply module card that has a power supply module is removably coupled in the power supply module card slot.

In another embodiment, a method of operating a transmission path network. The method comprising, grouping a plurality of transmission paths with an associated redundant transmission path. Coupling an output signal from a multiplexer addressed to a faulty transmission path in the group of transmission paths to the redundant transmission path. Coupling the redundant transmission path to replace the faulty transmission path at a subscriber.

In another embodiment, a method of switching transmission paths, the method comprising grouping a plurality of standard transmission paths in separate groups. Monitoring each standard transmission path for errors by sending a test signal from a central office to a remote circuit and back. Detecting errors in a standard transmission path in one of the standard transmission paths in a group of standard transmission paths. Outputting signals directed to the standard transmission path with errors from a multiplexer in the central office to a redundant transmission path associated with the group of standard transmission paths instead of the standard transmission path with errors. Coupling the redundant transmission path to an end portion of the standard transmission path with errors at the remote circuit, wherein signals directed to the standard transmission path with errors are routed around the standard transmission path.

In another embodiment, a method of operating a remote shelf enclosure, the method comprising, selectively coupling a plurality of remote units in associated remote units slots. Selectively coupling a protection remote unit in a protection remote slot. Selectively coupling a protection switching controller in a protection switching controller slot. Selectively coupling a power supply module in a power supply slot. Coupling a standard transmission path to each of the remote units. Coupling a protection transmission path to the protection remote unit. Monitoring the standard transmission paths for errors. When errors are detected in a standard transmission path, switching an output of the standard transmission path with the errors for an output of protection transmission path.

BRIEF DESCRIPTION OF THE DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Figure 1:
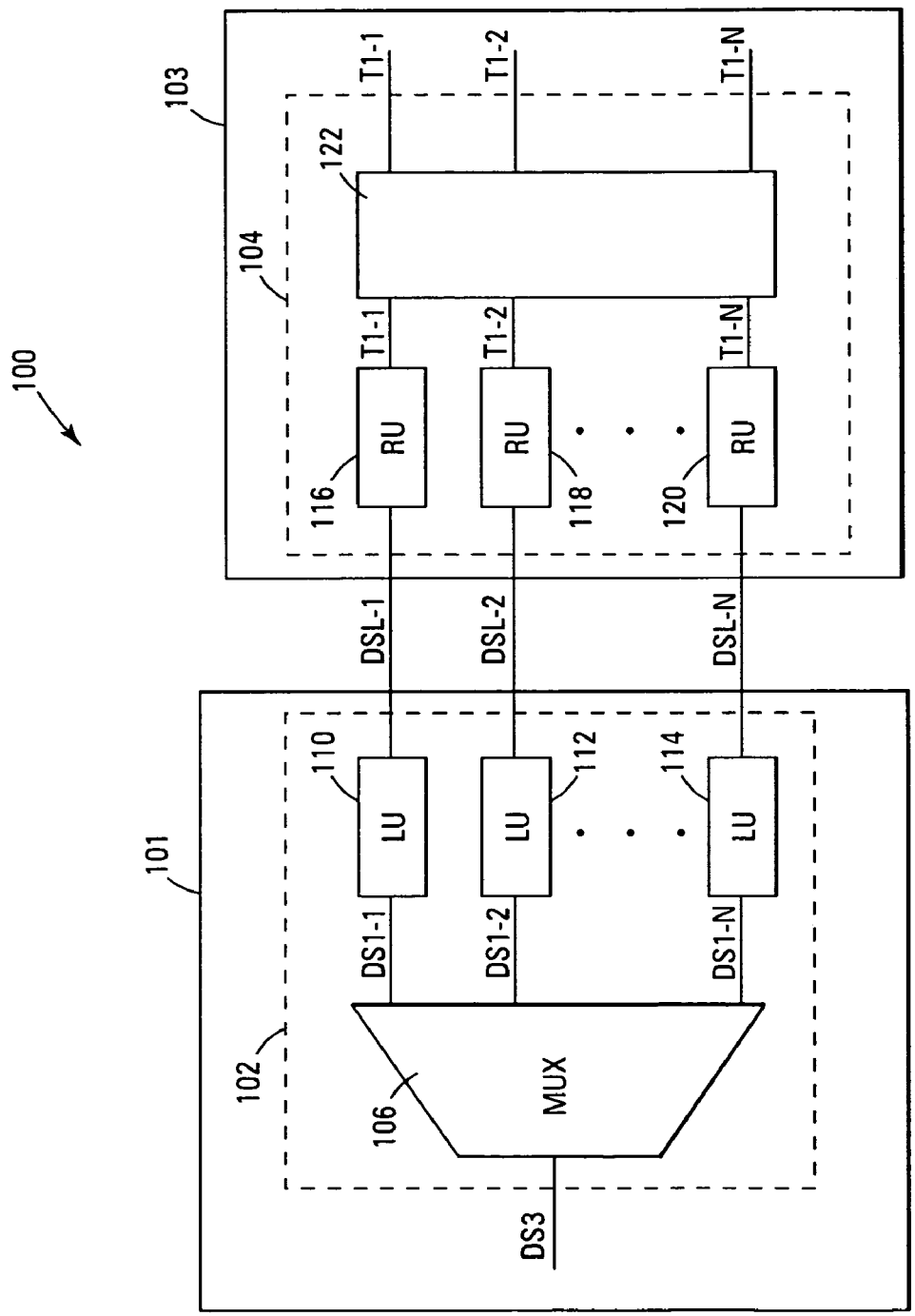
FIG. 1 is a block diagram of an embodiment of a protection switching mechanism of the present invention.

Embodiments of the present invention provide an efficient protection switching architecture for transmission paths. In particular, one embodiment selectively replaces a faulty transmission path from a plurality of transmission paths with a redundant transmission path. Referring to FIG. 1, a protection switching mechanism 100 of one embodiment of the present invention is illustrated. As illustrated, the protection switching mechanism 100 includes a multiplexer circuit 102 and a remote circuit 104. The multiplexer circuit 102 includes a multiplexer 106. In the embodiment illustrated in FIG. 1, multiplexer 106 has an input to receive a DS3 transmission path. The multiplexer 106 has a plurality of outputs coupled to DS1(1-N) transmission paths. In one embodiment the multiplexer has 28 outputs to provide 28 DS1 transmission paths from the DS3 transmission path. It will be understood in the art that although the multiplexer in the multiplexer circuit 102 is referred to as a multiplexer 106 is really a demultiplexer 106 used to separate out the multiplexed signal in the DS3 transmission path into 28 DS1 transmission paths.

Each output from the multiplexer 106 has an associated line unit (LU). In one embodiment, the line units are also located in the multiplexer circuit 102. It will be understood in the art that although FIG. 1 only illustrates LU 110, 112 and 114, there would be a line unit for every output of the multiplexer 106. Each line unit provides an asynchronous DS1 interface with an associated digital subscriber line (DSL) 1-N. For example, the digital subscriber line (DSL) could be an asymmetric digital subscriber line (ADSL), a high-bit-digital subscriber line (HDSL), a high-bit-digital subscriber line 2 (HDSL2), a high-bit-digital subscriber line 4 (HDSL4) or a symmetric high-bit-digital subscriber line (G.SHDSL).

The remote circuit 104 includes a remote unit (RU) 116, 118, and 120 for each line unit to convert the DSL line back to a DS1 (or T1, E1 or the like) at the customers premise. The remote circuit 104 also includes a relay circuit 122. The relay circuit 122 contains a plurality of relays to selectively switch transmission paths. Embodiments of the present invention separate the transmission paths DS1 (1-N) into groups, wherein each group comprises a plurality of standard transmission paths and a protection (redundant transmission path). For example in one embodiment, the transmission paths are grouped into 5 normal or standard transmission paths and a protection or redundant transmission path. In one embodiment the multiplexer circuit 102 is housed in a central office 101 and the remote circuit 104 is housed at the subscribers location 103. In another embodiment, the transmission paths are bi-directional. Moreover, although not shown, it will be understood in the art that one of more repeaters may be positioned between the multiplexer circuit 102 and the remote circuit 104 to boost signal strengths.

Figure 2:
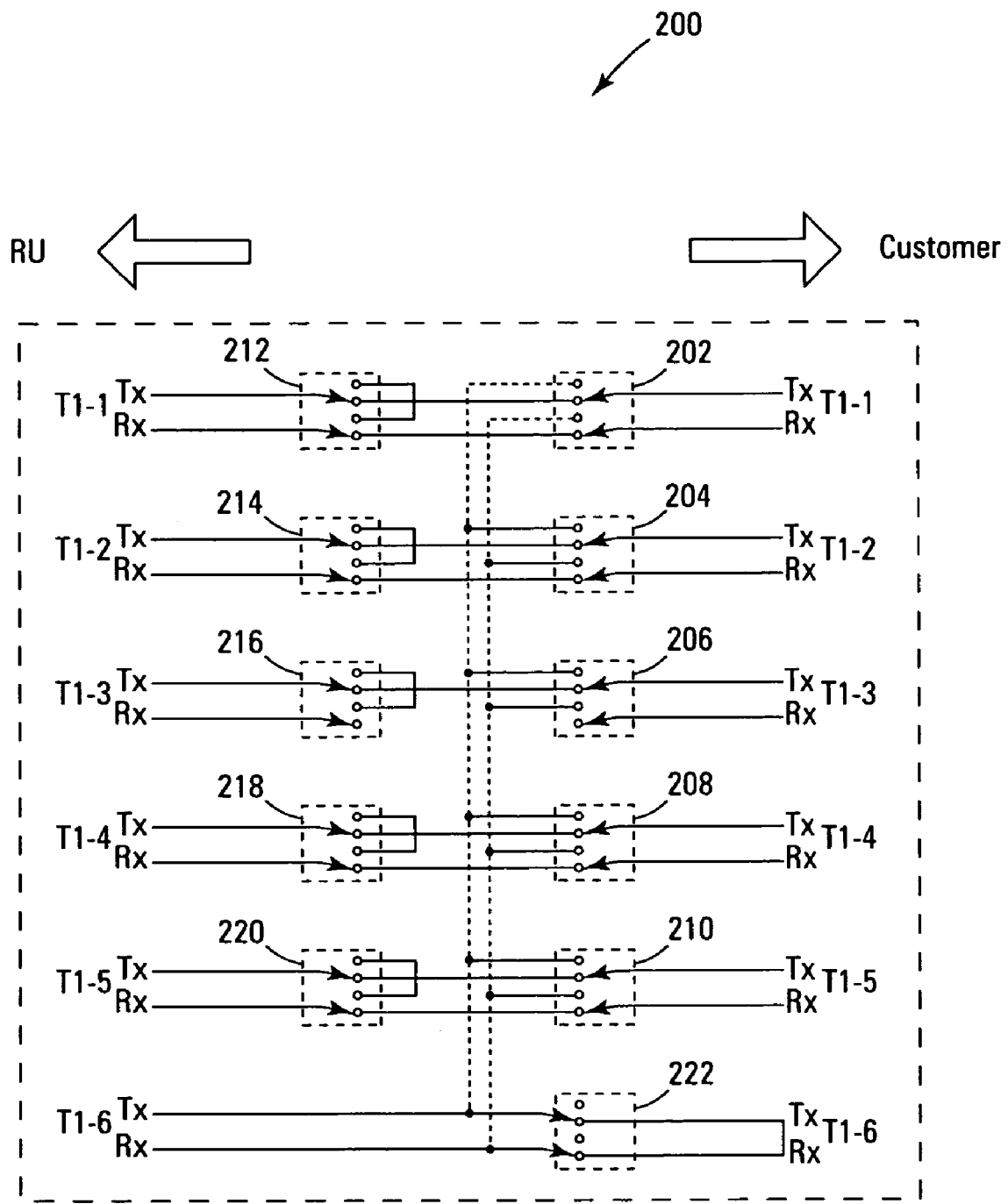
FIG. 2 is a schematic diagram of one embodiment of the switching architecture of relays of the present invention.

An embodiment of a relay circuit 200 of the present invention is illustrated in FIG. 2. In this embodiment, T1 transmission lines T1-1 through T1-5 are selectively coupled to a protection (or redundant) T1-6 transmission lines through relays 202, 204, 206, 208, 210 and 222. Relays 202, 204, 206, 208, 210 and 222 are positioned between a remote unit (RU) and a customer or subscriber as illustrated in FIG. 2. In operation, if a transmission line has been detected as being faulty, its associated switch will be tripped to coupled the redundant protection T1-6 line to the customer instead of the faulty transmission line. For example, if transmission line T1-2 is detected as being faulty, relay 204 is tripped to connect transmission line T1-6 to the subscriber instead of T1-2. The connection to transmission line T1-6 is illustrated by the dotted lines. Moreover, when a faulty transmission line is detected, relay 222 is also tripped so the transmission line is correctly directed to replace the faulty transmission line.

Also illustrated in FIG. 2, are test relays 212, 214, 216, 218 and 220. The test relays 212, 214, 216, 218 and 220 are used to test the respective transmission paths. In use, a respective relay is tripped or switched to form a closed circuit. For example, in testing T1-2 transmission line, relay 214 is switched to form a closed circuit loop. A test signal is then sent down a current path Tx (first conductive line) of transmission line T1-2. Since the status relay 214 is tripped to form a closed loop, the signal returns back through Rx (second conductive line) of transmission line T1-2. This return signal can then be monitored for defects in the transmission line T1-2.

Figure 3:
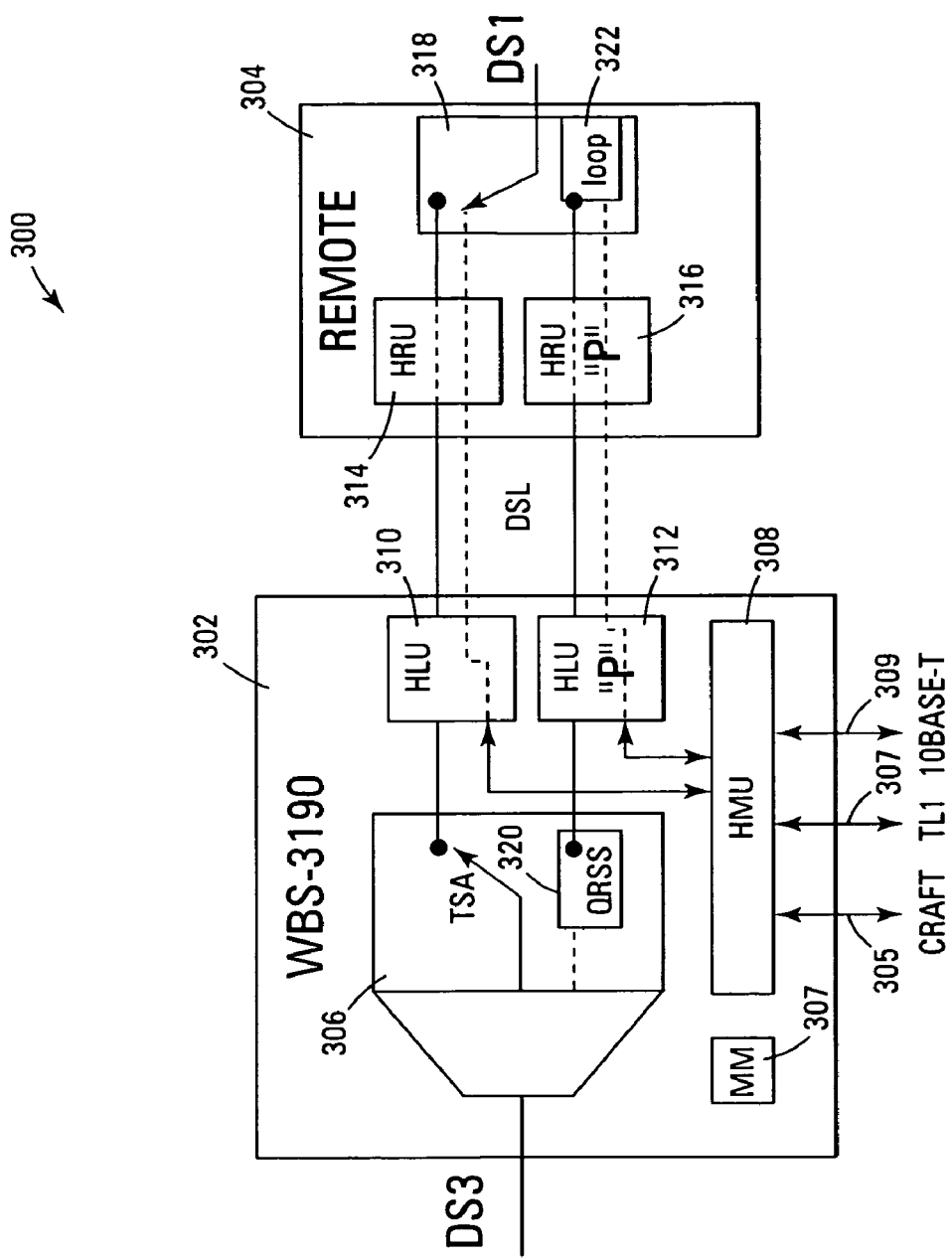
FIG. 3 is a block diagram of an embodiment of a protection switching mechanism of the present invention.

An illustration of how one embodiment of the present invention is controlled is illustrated in FIG. 3. FIG. 3 illustrates a protection switching mechanism 300 also having a multiplexer circuit 302 and a remote circuit 304. The multiplexer circuit 302 is illustrated as having a standard LU 310, which in this embodiment is a HiGain Line Unit (HLC) 310, and a redundant or protective HLU 312 produced by ADC Telecommunications Inc. The multiplexer circuit also has a management unit 308, which in this embodiment is a HiGain management unit (HMU) 308 produced by ADC Telecommunications Inc. The HMU controls multiplexer 306 as well as switching functions in the remote circuit 304. The remote circuit 304 of the protection switching mechanism 300 is illustrated as having a standard remote unit 314, which in this embodiment is a high gain remote unit (HRU) 314 and a redundant or protection HRU 316. The remote circuit 304 is also illustrated as having relay circuit 318.

In the embodiment of FIG. 3, multiplexer 306 implements a time slot assignment TSA in sending a signal to a specific HLU 310 during normal operations. As illustrated, a test signal from a quasi-random signal source QRSS 320 is sent through a redundant path that includes HLU 312 and HRU 316. This test signal is looped back by relay 322 through a return path through HRU 316 and HLU 312 to the multiplexer 306. This test signal continuously tests if the redundant transmission line is functional during a normal mode of operation. If a standard transmission path is detected as being faulty, the HMU directs the signal assigned to the faulty standard transmission path from an output of the multiplexer 306 to the redundant transmission path. For example, if the transmission path coupled to HLU 310 is determined to be faulty, the HMU will direct the multiplexer to output a signal originally addressed or directed to the defective standard transmission path to the redundant HLU 312. The HMU also directs the appropriate relays in the remote circuit 304 to direct the appropriate signal to the intended subscriber line from the remote unit 304. The HMU 308 is coupled to control the relays in the relay circuit 318 through associated HLU 310, 312 and HRU 314, 316 (as illustrated by the dashed lines).

Embodiments of the HMU 308 of the present invention include a memory to store protection switching information as well as logic circuitry to perform logic functions. In one embodiment, the HMU 308 is programmed to be revertive with a switching back time. That is, in this embodiment, a transmission path that was determined to be faulty will be switched back into use when the transmission path is error free for a period determined by the switching back time. In this embodiment, a QRSS test signal is coupled to the faulty transmission path and monitored by the HMU 308 for errors. In another embodiment, the HMU is non-revertive. In yet another embodiment, the multiplexer circuit 302 includes a multiplexer memory 307 to store information that includes switching information.

As illustrated in FIG. 3, the HMU 308 has a craft port 305. The craft port 305 provides a user interface to the HMU 308. In embodiments of the present invention the user interface allows a user to specify the redundant transmission paths, to specify the standard transmission paths, the switching back time as well as allowing a user to do a forced protection switching request. In addition, in some embodiments of the present invention the craft port 305 allows the user to monitor an alarm status of the line units. Moreover, in some embodiments the craft port 305 can be used by the user to preset an alarming level due to a protection switchover such as critical alarm, major alarm, minor alarm, not alarmed or not reported. Thereafter, when the HMU monitors an alarm, an appropriate alarm level will be conveyed using the predefined alarm parameters 308 set by the user. Also illustrated in FIG. 3, is a TL1 port 307 and a 10 base-t interface 309 to the HMU 308, which can also be used to supply a user interface.

Figure 4:
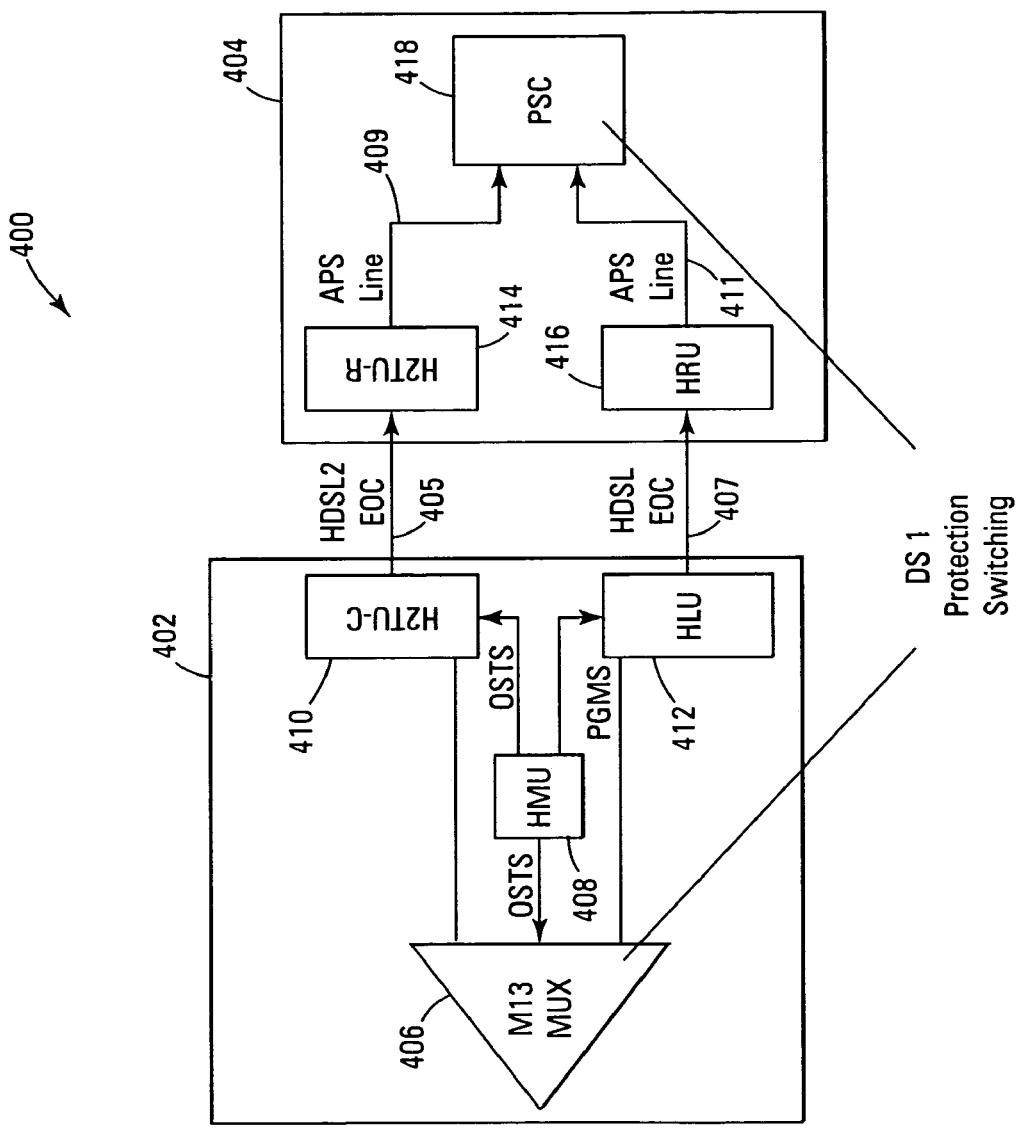
FIG. 4 is a block diagram of another embodiment of a protection switching mechanism of the present invention.

In one embodiment, the line units and the remote units have a high-bit-rate digital subscriber line (HDSL) version and in another embodiment the line units and the remote units have a HDSL2 version. This is illustrated in FIG. 4. In particular, FIG. 4 illustrates another embodiment of the switching protection mechanism 400 with both HDSL and HDSL2 versions. As illustrated, a multiplexer circuit 406 includes a HMU 408, a line unit 410 for the HDSL2 version and a line unit 412 for the HDSL version. A remote circuit 404 includes remote unit 414 for the HDSL2 version, a remote unit 416 for the HDSL version and a protection switching card 418.

FIG. 4 also illustrates, how HMU 408 communicates with the multiplexer 406 and the remote circuit 404 in one embodiment. In this embodiment, control commands from the HMU 408 are sent to the respective line unit 410 or 412 using appropriate respective protocol. The control commands are then sent down through an embedded operating channel EOC 405 or 407 to the associated remote unit 414 or 416. Thereafter, the control commands are sent to a controller card 418 in the remote circuit 404 through an associated APS bus 409 or 411. The controller card 418 in the remote circuit 404 controls a plurality of relays (an embodiment of which are illustrated in FIG. 2) that control the switching at the remote circuit 404 end.

Figure 5A:
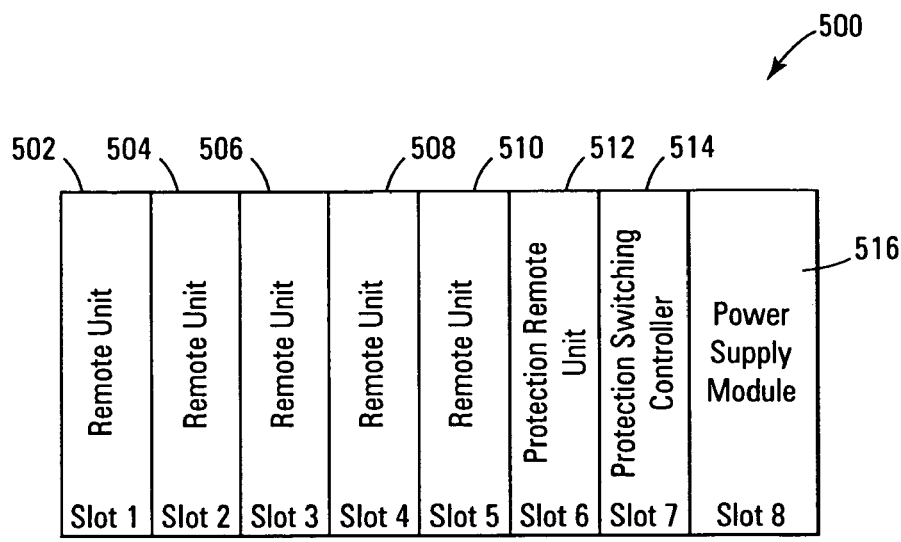
FIG. 5A is a front-view of one embodiment of a remote shelf enclosure of the present invention.

An embodiments of a remote circuit is housed in a remote shelf enclosure 500 as illustrated in FIG. 5A. As illustrated, in this embodiment, a remote unit card 502 is positioned in slot 1, a remote unit card 504 is positioned in slot 2, a remote unit card 506 is positioned in slot 3, a remote unit card 508 is positioned in slot 4, a remote unit card 510 is position in slot 5, a protection (or redundant) remote unit card 512 is positioned in slot 6, a protection switching controller card 514 is positioned in slot 7 and a power supply module 516 is positioned in slot 8. In particular, the respective cards 502, 504, 506, 508, 510, 512, 514 and 516 are selectively coupled in their respective slot. In one embodiment, slots 1-6 are designed to hold both 4-wire HDSL or 2-wire HDSL2 remote units. The plurality of relays (an embodiment of which is illustrated in FIG. 2) are located in the protection switching controller 524.

Figure 5B:
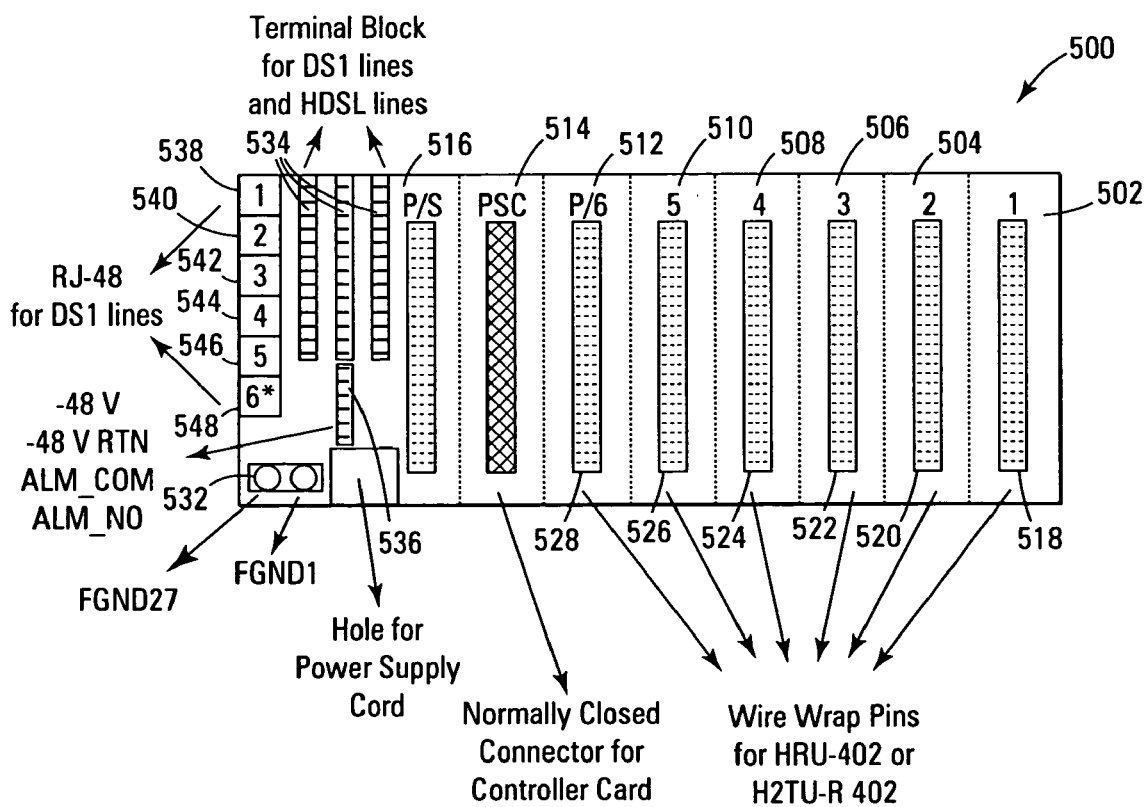
FIG. 5B is a back-view of one embodiment of a remote shelf enclosure of the present invention.
Figure 5C:
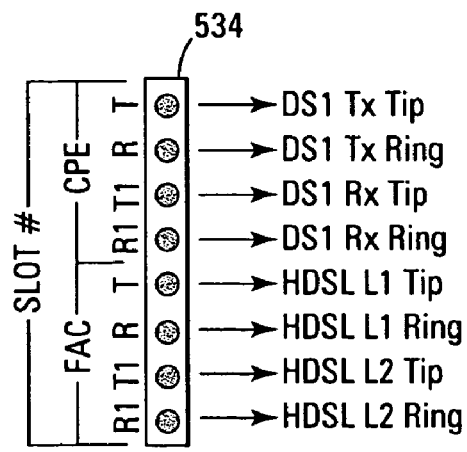
FIG. 5C is an back-view of a portion of a terminal block of a remote shelf enclosure of one embodiment of the present invention.
Figure 5D:
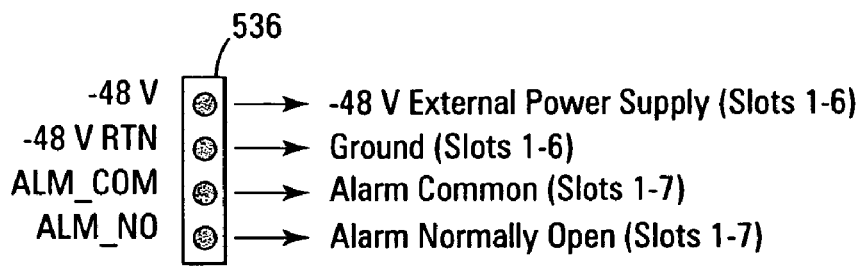
FIG. 5D is an back-view of a external voltage supply connection of a remote shelf enclosure of one embodiment of the present invention.
Figure 5E:
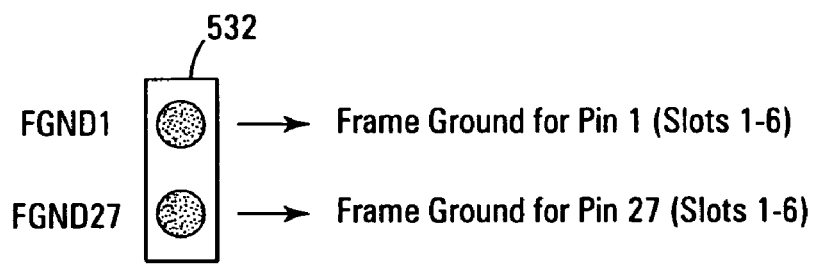
FIG. 5E is an back-view of ground connections of a remote shelf enclosure of one embodiment of the present invention.

A back-view of an embodiment of the remote shelf enclosure 500 is illustrated in FIG. 5B. As illustrated, wire wrap pins 518, 520, 522, 524, 526 and 528 are provided to couple a respective DS1, HDSL or HDSL2 to a respective remote unit card 502, 504, 506, 508, 510 or 512. In addition, ground connections 532 are also included as well as terminal block 534 to provide HDSL/HDSL2 and DS1 connections and an external voltage supply connection 536. For better clarification, a portion of terminal block 534 is illustrated in FIG. 5C, the external voltage supply connection 536 is illustrated in FIG. 5D and the ground connections are illustrated in FIG. 5E. Referring back to FIG. 5B, the remote shelf unit 500 further includes registered jacks (RJ)-48's 538, 540, 542, 544, 546 and 548 for slots 1-6 to provide respective DS1 connections to the subscriber.

Figure 6:
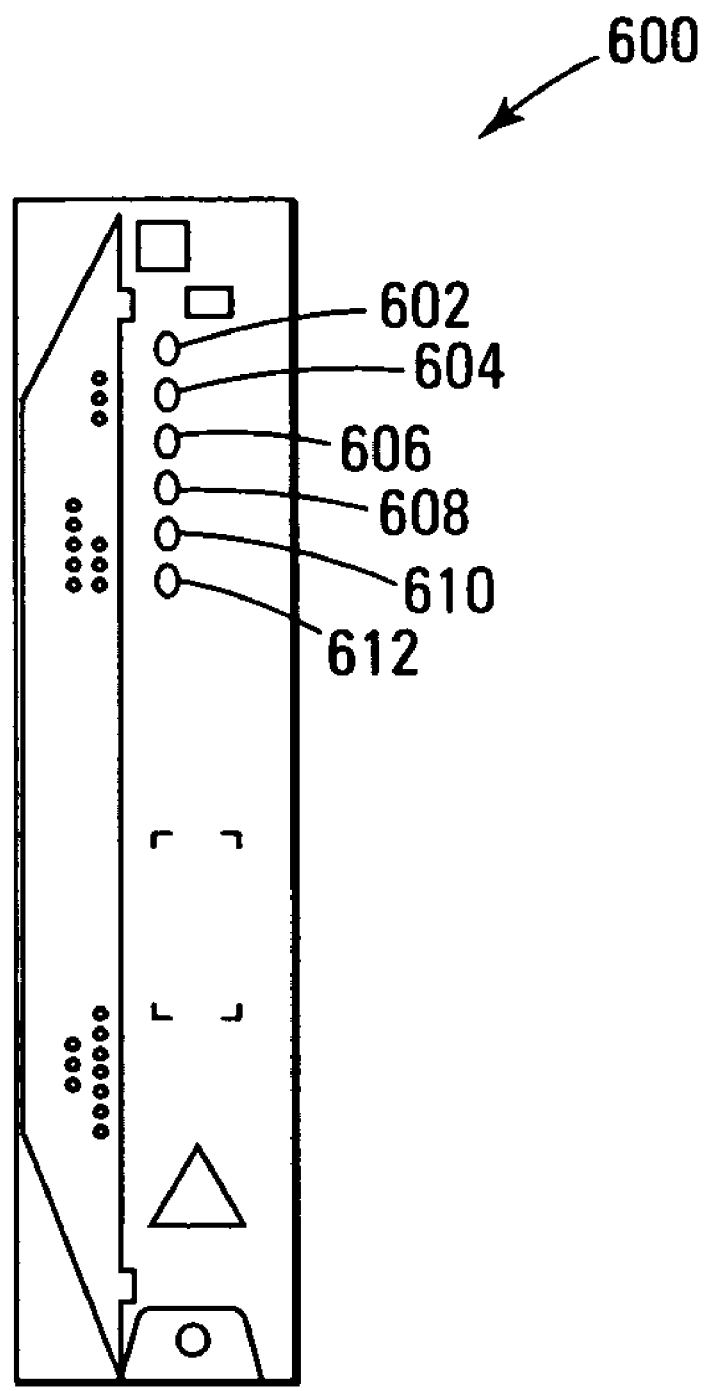
FIG. 6 is a perspective front-view of a protection switching controller of one embodiment of the present invention.

A front-view of one embodiment of the protection switching controller card 600 is illustrated in FIG. 6. The protection switching controller card 600 is used in slot 7 (514) of the remote shelf enclosure 500 of FIG. 5A. In this embodiment, the protection switching controller card 600 has a LED for each slot that contains a remote unit. For example in the remote shelf enclosure 500 of FIG. 5, there is an LED 602, 604, 606, 608, 610 and 612 for each slot 502, 504, 506, 508, 510 and 512 as illustrate in FIG. 6. In one embodiment, the LED associated with a standard remote unit is not illuminated when no errors are detected and is illuminated with a flashing red light when errors are detected. Moreover, in one embodiment, the LED associated with a redundant or protective remote unit is not illuminated when it is being used to pass data around a faulty transmission path, is illuminated with a green light when it is ready to protect its associated standard remote units and is illuminated with a flashing red light when a fault has occurred in the redundant transmission line. In one embodiment, only one LED is on at a time to reduce power consumption.

In one embodiment of the present invention, if a protection switching controller card is not inserted in a remote shelf enclosure, the remote shelf enclosure operates in a non-protective mode. In this embodiment, a loop-back relay for protection slot 6 (512 of FIG. 5A) is controlled by a special command to be either open or closed so an associated management unit MU can acknowledge the existence of the protection switching controller card. In yet another embodiment of the present invention remote unit 510 in slot 5 in FIG. 5 is also set up as a redundant remote unit 510. With this embodiment, if redundant (protective) remote unit 512 is connected to a faulty transmission line, remote unit 510 can takes its place as the redundant remote unit 510. Remote unit 510 in this embodiment can be referred to as a spare remote unit 510 to provide a spare redundant transmission path. Moreover, In this embodiment both slot 5 and slot 6 will have its own automatic protection switching (APS) bus coupled to the protection controller card (slot 7) to receive control commands from a management unit.

In addition, in one embodiment, the switching controller card 514 is powered by the power supply module 516. In another embodiment, the protection switching controller card 514 receives its power from an external power source through the external voltage supply connection 536. In one embodiment, external power supply source is a −48 volt DC power source. In yet another embodiment, the protection switching controller card 514 in slot 7 of FIG. 5A receives its power from the redundant or protective remote unit 512 in slot 6. In this embodiment, both slot 5 and slot 6 will have a power line "OR"ed together to the protection switching controller card slot 7. This provides a backup power to the protection switching controller card if the power in protective remote unit card 512 fails.

Figure 7:
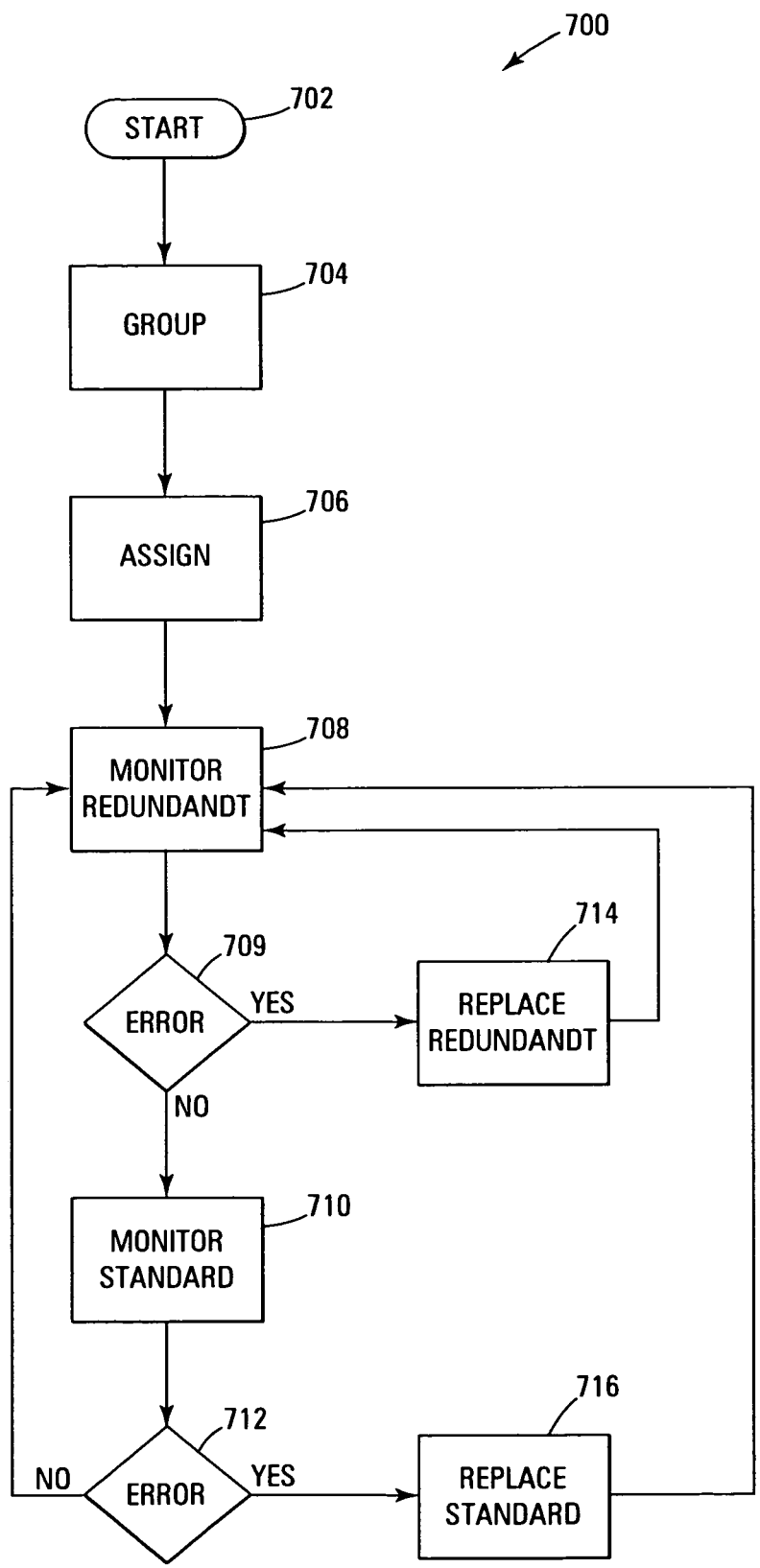
FIG. 7 is a flow chart illustrating one method of implementing the present invention.

FIG. 7 is a flow chart 700 of one embodiment of a method of monitoring and replacing a standard transmission path with a redundant transmission path according to the teachings of the present invention. As illustrated in flow chart 700, the method starts at 702. Transmission paths are grouped into sub groups of standard transmission paths 704. A redundant transmission path is then assigned to each group of standard transmission paths 706. The redundant transmission path is monitored for errors 708. If an error is discovered 709, the redundant transmission is replaced 714. If no errors are detected, the standard transmission lines are monitored 710. In another embodiment of the present invention (not shown) the redundant and the standard transmission lines are monitored at the same time. If an error or errors are not detected in a standard transmission path 712 the method returns to monitor the redundant transmission path 708. If an error is detected in a standard transmission line, the standard transmission path is replaced with the redundant transmission path 716. The redundant transmission path is then monitored for errors 708.

Figure 8:
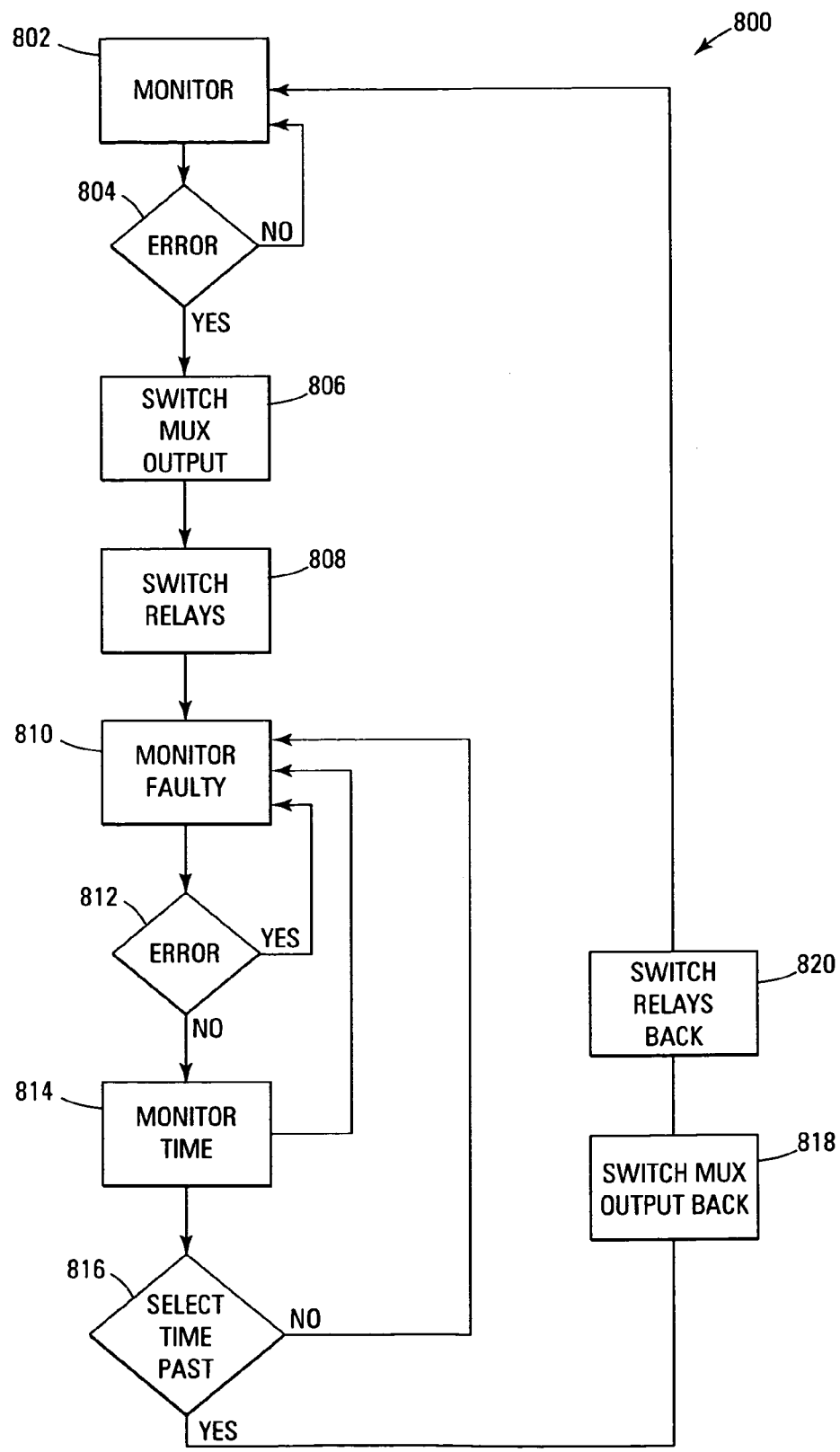
FIG. 8 is a flow chart illustrating one method of switching standard transmission paths with redundant transmission paths of the present invention.

Referring to FIG. 8, flow chart 800 illustrates replacing of a standard transmission line with a redundant transmission line in one embodiment of the present invention. As illustrated in flow chart 800, the standard transmission lines are monitored for errors 802. When no errors are detected 804, the monitoring continues 802. If an error or errors are detected in a standard transmission line 804, an output of a multiplexer directed to the faulty transmission path is switched to an associated redundant transmission path 806. Relays at a remote circuit are then switched to connect the subscriber to the redundant transmission path instead of the standard transmission path having errors 808. In another embodiment, (not shown) the outputs of the multiplexer and the relays are switched at the same time. The standard transmission path with the initial errors, in this embodiment, is then monitored 810. If the errors remain 812, the monitoring continues 810. If no more errors are detected 812, the time is monitored 814. If a select amount time has not past since the last error was detected 816, the monitoring continues 810. If, however, a select amount of time has past since the last error was detected 816, the standard transmission line is put back in service by switching the output of the multiplexer back to the standard transmission line 818 and switching the relays to connect the standard transmission line back to the subscriber 820. The standard transmission lines continue to be monitored 802.

What is claimed is:

1. A protection switching mechanism comprising:
   a multiplexer having an input coupled to receive an input signal and a plurality of outputs to output a plurality of output signals;
   a transmission path for each output of the multiplexer, each transmission path coupled to receive an associated output signal from the multiplexer, the transmission paths further including one or more redundant transmission paths, wherein signals directed to a faulty transmission path are redirected to an associated redundant transmission path;
   a remote circuit to selectively switch a redundant transmission path for a faulty transmission path at a subscriber;
   a management unit coupled to control the multiplexer and the remote circuit, the management unit having a memory to store switching information; and
   wherein the transmission paths are selected into groups comprising a plurality of standard transmission paths and a redundant transmission path, wherein the redundant transmission path is selectively coupled to replace a faulty transmission path among the standard transmission paths.

2. The protection switching mechanism of claim 1, wherein the remote circuit further comprises:
   a relay for each transmission path.

3. The protection switching mechanism of claim 1, wherein each group of transmission paths further includes a spare redundant transmission path selectively coupled to replace the redundant transmission path if the redundant transmission path is found to be faulty.

4. The protection switching mechanism of claim 1, wherein each group of transmission lines comprises up to 5 standard transmission lines and a redundant transmission line.

5. The protection switching mechanism of claim 1, wherein the switching information stored in the memory of the management unit includes the grouping of standard transmission paths as well as which redundant transmission path is associated with which group of standard transmission paths.

6. A protection switching mechanism comprising:
   a multiplexer having an input coupled to receive an input signal and a plurality of outputs to output a plurality of output signals;
   a transmission path for each output of the multiplexer, each transmission path coupled to receive an associated output signal from the multiplexer, the transmission paths further including one or more redundant transmission paths, wherein signals directed to a faulty transmission path are redirected to an associated redundant transmission path;
   a remote circuit to selectively switch a redundant transmission path for a faulty transmission path at a subscriber;
   wherein the input signal is a digital signal 3 (DS3 signal) and the output signals are digital signals (DS1 signals);
   a line unit for each transmission path to provide an asynchronous DS1 interface with the DSL;
   a remote unit for each transmission line to provide an interface from DSL back to DS1 at a customer's premise and
   a management unit coupled to control the multiplexer and the remote circuit, the management unit having a memory to store switching information.

7. The protection switching mechanism of claim 6, wherein each transmission path includes a digital subscriber line (DSL) portion.

8. A protection switching transmission path device comprising:
   a central office including,
      a multiplexer having an input and a plurality of outputs, and
      a management unit coupled to control the multiplexer;
   a remote circuit including,
      a plurality of relays and
      a controller card coupled to control the plurality of relays, wherein the control card is coupled to receive control signals from the management unit,
   a plurality of standard transmission paths, each standard transmission path coupled between an output of the multiplexer and an associated relay; and
   a plurality of redundant transmission paths, each redundant transition path is coupled between an output of the multiplexer and an associated relay, each redundant transmission path is further associated with a group of standard transmission paths, wherein if a standard transmission path in a group of transmission paths is detected as being faulty the management unit directs the multiplexer and the controller card to switch an associated redundant transmission path for the faulty standard transmission path.

9. The protection switching transmission path device of claim 8, wherein each standard transmission path farther includes:
   a standard line unit to provide an interface with output signals from the multiplexer, the standard line unit is positioned in the central office;
   a remote line unit to provide an interface for received signals, the remote unit being positioned in the remote circuit; and
   a standard transmission line coupled between the standard line unit and the remote unit.

10. The protection switching transmission path device of claim 9, further comprising:
    an automatic protection switching (APS) bus coupled between the standard remote unit and the controller card to provide a path for control signals from the management unit to the controller card.

11. The protection switching transmission path device of claim 9, wherein the standard transmission line is a digital subscriber line (DSL).

12. The protection switching transmission path device of claim 11, wherein the DSL is farther selected from the group consisting of a high-bit-rate digital subscriber line (HDSL) and a high-bit-rate digital subscriber line 2 (HDSL2).

13. The protection switching transmission path device of claim 12, wherein at least one of the standard transmission lines is HDSL and at least one of the standard transmission lines is HDSL2.

14. The protection switching transmission path device of claim 8, wherein each redundant transmission path further comprises:
    a redundant line unit to provide an interface with output signals from the multiplexer, the redundant line unit is positioned in the central office;
    a redundant remote line unit to provide an interface for received signals, the redundant remote unit being positioned in the remote circuit; and
    a redundant transmission line coupled between the standard line unit and the remote unit.

15. The protection switching transmission path device of claim 14, further comprising:
an automatic protection switching (APS) bus coupled between the redundant remote unit and the controller card to provide a path for control signals from the management unit to the controller card.

16. The protection switching transmission path device of claim 14, wherein the redundant transmission line is a digital subscriber line (DSL).

17. The protection switching transmission path device of claim 16, wherein the DSL is further selected from the group consisting of a high-bit-rate digital subscriber line (HDSL) and a high-bit-rate digital subscriber line 2 (HDSL2).

18. The protection switching transmission path device of claim 17, wherein some of the standard transmission lines are HDSL and some of the standard transmission lines are HDSL2.

19. A protection switching device comprising:
a plurality of standard transmission paths coupled between a central office and a remote circuit;
a redundant transmission path selectively coupled to replace one in a group of the plurality of standard transmission paths;
the remote circuit having a switch relay for each standard transmission path, each switch relay is coupled to an associated standard transmission path, each switch relay having a first position to provide a connection to a subscriber and a second position to provide a connection to the redundant transmission path, wherein when one of the plurality of standard transmission paths is found to be faulty its associated relay is positioned to the second position; and
the remote circuit having a redundant relay for the redundant transmission path, the redundant transmission path is coupled to an associated redundant relay, each redundant relay having a first position to provide a current loop path and a second position to provide an open circuit, wherein when one of the plurality of standard transmission paths in a group of standard transmission paths is found to be faulty a redundant relay coupled to an associated redundant transmission path is placed in its second position so signals in the redundant transmission path are routed to the subscriber.

20. The protection switching device of claim 19, further comprising:
a test relay for each of the plurality of standard transmission paths, each test relay is coupled to an associated standard transmission path. Each test relay having a first position to provide a connection to a respective subscriber and a second position to provide a closed circuit loop, wherein a standard transmission path can be tested when the test relay is in the second test position by providing a signal to a first conductive line of the transmission line and monitoring its return in a second conductive line of the transmission line.

21. The protection switching device of claim 19, further comprising:
the central office having a multiplexer, the multiplexer having an input to receive an incoming signal and a plurality of outputs, wherein select outputs of the multiplexer are coupled to the plurality of standard transmission paths and one of the outputs is coupled to the redundant transmission path, wherein when a standard transmission path is determined to be faulty the output of the multiplexer assigned to the faulty standard transmission path is output to the redundant transmission path instead.

22. The protection switching device of claim 21, further comprising:
the central office having a management unit, the management unit coupled to the multiplexer to control output signals of the multiplex, the management unit also coupled to control the switch relays and the redundant relays.

23. The protection management device of claim 19, wherein each standard transmission path further comprises:
a standard line unit positioned in the central office;
a standard remote unit positioned in the remote circuit; and
a digital subscriber line (DSL) coupled between the standard line unit and the standard remote unit.

24. The protection management device of claim 23, wherein the DSL is a high-bit-rate digital subscriber line (HDSL).

25. The protection management device of claim 23, wherein the DSL is a high-bit-rate digital subscriber line 2 (HDSL2).

26. A protection switching mechanism comprising:
a multiplexer having an input coupled to receive an input signal and a plurality of outputs to output a plurality of output signals;
a plurality of line units, each line unit is coupled to selectively receive an associated output of the multiplexer;
one or more redundant line units, each redundant line unit is selectively coupled to receive an output of the multiplexer associated with a line unit that is coupled to a faulty transmission line;
a remote unit for each line unit, each remote unit is coupled to an associated line unit;
a redundant remote unit for each redundant line unit, each redundant remote unit coupled to an associated redundant line unit;
a relay for each remote unit and each redundant remote unit, each relay for each remote unit is coupled an associated remote unit and each relay for each redundant remote unit is coupled to an associated redundant remote unit; and
a management unit to control the output of the multiplexer and the relays, wherein when the management unit detects a line unit coupled to a faulty transmission line an output of the multiplexer assigned to the line unit coupled to the faulty transmission line is directed to an associated redundant line unit instead and a relay coupled to the faulty transmission line as well as a redundant relay associated with the redundant line unit are switched to provide an alternate signal path around the faulty transmission line.

27. The protection switching mechanism of claim 26, wherein the management unit further comprising:
a memory to store switching information and logic circuitry.

28. The protection switching mechanism of claim 26, wherein the management unit further having a craft port to provide a user interface.

29. The protection switching mechanism of claim 26, wherein the management unit further having a TL1 port and a 10base-T port.

30. The protection switching mechanism of claim 26, wherein the plurality of line units and associated remote units are sectioned into groups, each group of line units and associated remote units include a redundant line unit and an associated redundant remote unit to selectively replace one of the line units and associate remote unit.

31. The protection switching mechanism of claim 30 wherein management unit controls the grouping of the line units and associated remote units.

32. The protection switching mechanism of claim 30, further comprising;
a multiplexer circuit containing the multiplexer, the line units and redundant line units, the multiplexer circuit further comprising a multiplexer memory to store switching information.

33. A remote circuit comprising:
a remote shelf enclosure having a plurality of remote unit slots, a protection remote unit slot, a protection switching controller slot and a power supply module slot;
an automatic protection switching (APS) bus coupled between the protection remote unit slot and the protection switching controller slot;
a remote unit card having a remote unit removably coupled in each remote unit slot;
a protection remote unit card having a protection remote unit removably coupled in the protection remote unit slot;
a protection switching controller card having a protection switching controller removable coupled in the protecting switching controller slot; and
a power supply module card having a power supply module removably coupled in the power supply module card slot.

34. The remote circuit of claim 33, wherein the plurality of remote unit slots comprise 5 slots.

35. The remote circuit of claim 33, wherein the protection switching controller card has a plurality of light emitting diodes to convey the status of the remote units and the protection remote units.

36. The remote circuit of claim 33, wherein the remote shelf enclosure has a back side, the back side having a plurality of openings adjacent the plurality of remote unit cards and the protection remote unit card, wherein each remote unit card and the protection remote unit card has a input connection positioned adjacent an associated opening when selectably coupled in an a respective slot.

37. The remote circuit of claim 33, wherein the remote shelf enclosure has an output connection for each of the remote unit slots and the protection remote unit slot.

38. The remote circuit of claim 33, further comprising:
an automatic protection switching (APS) bus coupled between at least one of the remote unit slots and the protection switching controller slot.

39. The remote circuit of claim 33, wherein the protection switching controller card is coupled to receive its power from the power supply module card.

40. The remote circuit of claim 33, wherein the protection switching controller card is coupled to an external power supply.

41. A remote circuit comprising:
a remote shelf enclosure having a plurality of remote unit slots, a protection remote unit slot, a protection switching controller slot and a power supply module slot, wherein the protection switching controller slot is positioned adjacent the protection remote unit slot; and further wherein the protection switching controller slot receives its power from the protection remote unit slot;
a remote unit card having a remote unit removably coupled in each remote unit slot;
a protection remote unit card having a protection remote unit removably coupled in the protection remote unit slot;
a protection switching controller card having a protection switching controller removable coupled in the protecting switching controller slot; and
a power supply module card having a power supply module removably coupled in the power supply module card slot.

42. The remote circuit of claim 41, wherein a remote unit slot adjacent the protection remote unit slot is coupled to the protection switching controller slot to provide power when the power in the protection remote unit slot fails.

43. A method of operating a transmission path network, the method comprising:
grouping a plurality of transmission paths with an associated redundant transmission path;
coupling an output signal from a multiplexer addressed to a faulty transmission path in the group of transmission paths to the redundant transmission path;
coupling the redundant transmission path to replace the faulty transmission path at a subscriber; and
replacing the faulty transmission path at the subscriber with a plurality of relays at a remote circuit.

44. The method of claim 43, further comprising:
controlling the multiplexer and the relays with a management unit.

45. The method of claim 44, wherein controlling the multiplexer further comprises:
sending a control command to the multiplexer implementing a time slot assignment to output signals through a selective output of the multiplexer.

46. The method of claim 44, wherein controlling the relays further comprises:
sending control commands to a respective line unit in a transmission path;
passing the control commands through an embedded operating channel to an associated remote unit in the transmission path;
passing the control commands through an automatic protection switching bus to a controller card in a remote circuit that controls the relays; and
selectively positioning the relay in response to the control signals.

47. The method of claim 44, further comprising:
programming a memory in the management unit to store switching parameters.

48. The method of claim 47, further comprising:
storing into the memory which transmission lines are the redundant transmission paths.

49. The method of claim 47, further comprising:
storing into the memory the grouping of transmission paths.

50. The method of claim 47, further comprising:
storing into the memory a switching back time, wherein a faulty transmission line will be used again if it is free from errors for a period of time determined by the switching back time.

51. The method of claim 47, further comprising:
storing into the memory alarm parameters.

52. A method of switching transmission paths, the method comprising:
grouping a plurality of standard transmission paths in separate groups;
monitoring each standard transmission path for errors by sending a test signal from a central office to a remote circuit and back;
detecting errors in a standard transmission path in one of the standard transmission paths in a group of standard transmission paths;

outputting signals directed to the standard transmission path with errors from a multiplexer in the central office to a redundant transmission path associated with the group of standard transmission paths instead of the standard transmission path with errors; and coupling the redundant transmission path to an end portion of the standard transmission path with errors at the remote circuit, wherein signals directed to the standard transmission path with errors are routed around the standard transmission path.

53. The method of claim 52, further comprising:

storing switching parameters in a memory in the central office.

54. The method of claim 52, further comprising:

switching back to the standard transmission line once a period of time has passed in which no further errors are detected.

55. The method of claim 52, further comprising:

monitoring the redundant transmission path for errors.

56. The method of claim 55, further comprising:

when an error is found in the replacing redundant transmission path, replacing the redundant transmission path with a standard transmission path in an associated group of standard transmission paths.

57. The method of claim 52, wherein coupling the redundant transmission path to an end portion of the standard transmission path with errors at the remote circuit further comprises:

switching a relay in the remote circuit that is coupled between the transmission line with the error and a subscriber to a position that couples the redundant transmission line to the subscriber; and switching a redundant relay in the remote circuit that is coupled to the redundant transmission path to an open circuit position, wherein the signals in the redundant transmission path are passed to the subscriber.

58. The method of claim 57, wherein switching the relay and the redundant relay further comprises:

providing a control signal from a management unit in the central office.

59. The method of claim 52, wherein outputting signals directed to the standard transmission path with errors from a multiplexer in the central office to a redundant transmission path associated with the group of standard transmission paths instead of the standard transmission path with errors, further comprises:

providing a control signal to the multiplexer from a management unit directing input signals to the multiplexer to specific outputs of the multiplexer.

60. The method of claim 59, further comprising;

storing switching parameters in a memory of the management unit.

61. A method of operating a remote shelf enclosure, the method comprising:

selectively coupling a plurality of remote units in associated remote units slots;

selectively coupling a protection remote unit in a protection remote slot;

selectively coupling a protection switching controller in a protection switching controller slot;

selectively coupling a power supply module in a power supply slot;

coupling a standard transmission path to each of the remote units;

coupling a protection transmission path to the protection remote unit;

monitoring the standard transmission paths for errors; and when errors are detected in a standard transmission path, switching an output of the standard transmission path with the errors for an output of the protection transmission path.

62. The method of claim 61, wherein the plurality of remote units is five remote units.

63. The method of claim 61, further comprising:

monitoring if the protection switching controller is coupled in the protection switching controller slot.

64. The method of claim 61, further comprising;

illuminating a light emitting diode (LED) associated with a standard transmission path on the protection switching controller when an error has been detected.

65. The method of claim 61, further comprising:

illuminating a LED associated with the protection remote unit when the protection remote unit when it is ready to pass a signal around a transmission path that has errors; and pulsating a LED on an off when an error has been detected in the protection remote unit.

* * * * *